Patented May 9, 1950

2,507,175

UNITED STATES PATENT OFFICE 2,507,175

SILVER RECOVERY

Stephen C. Pool, Rochester, N. Y., assignor to Eastman Kodak Company, Rochester, N. Y., a corporation of New Jersey No Drawing. Application July 11, 1947, Serial No. 760,493

2 Claims. (Cl. 75—108)

This invention relates to processes for the recovery of silver from sources which contain only small or minute amounts of silver such as in waste photographic solutions, and more particularly to recovering silver from such solutions which contain substantial amounts of hydroxy acids such as tartaric, citric, salicylic and malic acids or their compounds.

In Hickman et al. Patent 2,131,045 of September 27, 1938, there is described a method for recovering minute quantities of silver from waste photographic solutions which may exist in the solutions as free silver, in finely divided or colloidal form, or as silver halides and so forth. These solutions may be obtained from waste water obtained in photographic processing, film scrap washings and various other sources, and may also contain various other components such as gelatin, bromides, iodides and the like. The problem of separating the minute amounts of free silver and insoluble silver compounds from considerable volumes of solution is accomplished by employing a depositing agent preferably a metallic sulfate such as aluminium or copper sulfate. One of these metal sulfates may be added to the solution, which has previously been made alkaline, and the resulting reaction produces an insoluble metallic hydroxide which on precipitation comes down as a sludge containing substantially all of the solids in the solution including silver and any of its insoluble compounds there present. The silver containing sludge is generally composed of metallic sulfate, gelatin and any other waste solids not in solution in the original waste solution. After the sludge has settled, the clear supernatant liquid above the silver containing sludge may be discharged to a sewer. Even in the sludge the silver content is relatively very small and to decrease the ratio of other materials to silver, the sludge may be treated with sulfuric acid to form products which can be separated from the silver remaining in the sludge. Certain of these products can also be economically recovered. The sludge can then be smelted and the resulting silver cast into anodes and electrolytically purified to give a high grade silver which can again be used in photographic emulsion production.

The process described in Patent 2,131,045 is an excellent way of recovering silver existing in various forms in waste photographic solutions. However, other photographic processes have been developed in which hydroxy organic acids such as citric, tartaric, salicylic and malic acids and certain of their metal salts are employed.

The waste products and solutions from these processes, therefore, contain not only silver in various forms but also one or more of these hydroxy acids or their salts. It was found that these hydroxy acids and salts interfered with the operation of the above-mentioned floc precipitation processes when employing aluminium, copper, or iron hydroxide flocs, and the normal amount of silver was not recovered if such organic acid compounds were present. In fact, I have found that the suspended solids in solutions containing more than 1000 parts of sodium citrate per million cannot be satisfactorily coagulated with conventional aluminium compounds as a source of aluminium hydroxide floc.

I have now found a procedure whereby the recovery of minute amounts of silver from waste photographic solutions or the like can be effectively conducted even though the solution may contain relatively large proportions of the aforementioned hydroxy organic acids or their metal salts.

The invention, therefore, has for its prime object an improved method for recovering silver from various solutions and mixtures which contain substantial quantities of hydroxy organic acids or salts thereof. Another object is an improved floc precipitating method for recovering silver present in minute quantities from waste photographic solutions and mixtures which contain substantial quantities of hydroxy organic acids and salts thereof. A further object is to provide a recovery process in which the precipitating floc is produced or regenerated during the process. Another object is to provide a silver recovery process which is economical. A still further object is to provide a process for the recovery of silver from waste photographic materials in which the silver produced is of high grade quality. Other objects will appear hereinafter.

In accordance with the invention, I have discovered that solids present in waste photographic solutions containing considerable amounts of hydroxy organic acids and/or salts thereof may be coagulated without difficulty due to the presence of these organic acids by adding a small amount of a magnesium salt and an alkali to make the solution alkaline, thereby producing a magnesium hydroxide floc. It is desirable to add lime or slaked lime to bring the photographic waste solution to an alkaline condition of a pH of approximately 10 or higher, after the magnesium sulfate has been added. If the hydroxy acid concentration of the original waste solution is not too great, another alkali such as caustic soda may be employed to adjust the pH of the solution.

After a floc of magnesium hydroxide has formed in the solution, it will coagulate and precipitate the suspended solids, including silver halides and any other insoluble colloidal silver metal or silver compounds, and can be separated in the form of a sludge or slurry which may be concentrated and smelted by known processes to recover the silver.

In accordance with another feature of the invention, the magnesium employed in the above-described operation may also be recovered and reused in the silver separating process. After the magnesium hydroxide floc has precipitated and is commingled with the insoluble silver and other compounds as a sludge, the aqueous solution remaining may be separated therefrom and the sludge treated with an aqueous acid solution to neutralize partially the sludge, thereby extracting a magnesium salt and concentrating the sludge.

While other acids may be employed, it is preferred to employ sulfuric acid since this reacts to form magnesium sulfate which is soluble in the aqueous acid and may be separated by drawing off the solution from the sludge. The magnesium sulfate solution may then be employed, if desirable, in the first operation of my invention to form magnesium hydroxide in another solution containing recoverable silver and hydroxy organic acids or their salts. A satisfactory acid addition is about 5 cc. of concentrated sulfuric acid per gallon of sludge.

The following examples illustrate the invention:

Example 1

Waste photographic solution containing 1300 parts of anhydrous sodium citrate per million and 117 parts of silver per million was treated with 6.5 pounds of Epsom salt per thousand gallons, and then with 6.5 pounds of slaked lime per thousand gallons. The solids coagulated and settled in about one hour leaving clear solution of a pH of 11.1. To determine the efficiency of the separation of the silver from the original solution, the treated solution was analyzed and found to contain but 1.14 parts of silver per million. In other words, approximately 116 out of 117 parts per million were recovered by my process.

Example 2

The method described in Example 1 was conducted on an additional portion of the same waste photographic solution. After the solids had settled out as a sludge, the clear solution was drawn off and approximately 5 pounds of a 93% sulfuric acid solution per 200 gallons of sludge was added to adjust the pH of the mixture to a value from 7 to 9. The sludge was stirred to permit the sulfuric acid to react with the magnesium hydroxide floc and form soluble magnesium sulfate, settled, and the solution was drawn off and returned to storage for reuse in the operation described in Example 1. On smelting, the sludge gave an equivalent of 115 parts of silver per million parts of solution.

Example 3

Waste photographic solution containing 1300 parts of anhydrous sodium citrate per million and 120 parts of silver per million was treated with 9 pounds of Epsom salt per thousand gallons and then with 6.5 pounds of caustic soda per thousand gallons. A floc of magnesium sulfate formed and the solids coagulated and settled in about two hours, leaving a fairly clear solution of a pH of 11.1. Analysis of the treated solution showed a silver content of 5.66 parts of silver per million.

Example 4

The method described in Example 3 was repeated on an additional portion of the same waste photographic solution. After the solids had precipitated as a sludge, the clear solution was drawn off and approximately 6 pounds of a 93% sulfuric acid solution per 200 gallons of sludge was added to adjust the pH of the mixture to a value from 7 to 9. The sludge was stirred to permit the sulfuric acid to react with the magnesium hydroxide floc and form soluble magnesium sulfate, settled, and the solution was drawn off and returned to storage for reuse in the operation described in Example 1. On smelting, the sludge gave an equivalent of 114 parts of silver per million parts of solution.

Example 5

While the method of employing magnesium sulfate to form precipitating flocs in waste photographic solutions containing hydroxy organic acid compounds is a very effective way in which to collect the silver in a sludge which can then be smelted, I have found that it is also effective when no organic acid is present.

In a solution similar in character to that described in Example 1 but without the sodium citrate, an improved result was obtained by treatment with 4.5 pounds of Epsom salt and 4.5 pounds of slaked lime per thousand gallons. In this case, only 0.78 part of silver per million was left in the solution after the magnesium hydroxide had precipitated.

I claim:

1. A process for recovering silver from waste photographic solutions containing recoverable silver and substantial amounts of hydroxy organic acids including tartaric, citric, salicylic, and malic, which comprises adding magnesium sulfate to the solution adding slaked lime to adjust the pH of the solution to at least 10, whereby a magnesium hydroxide floc is formed, permitting the floc to coagulate the solids present in the solution and to precipitate in the form of a sludge from which silver may be obtained by a separation process.

2. A process for recovering silver from waste photographic solutions containing recoverable silver and substantial amounts of hydroxy organic acid salts which comprises adding magnesium sulfate to the solution, adding slaked lime to adjust the pH of the solution to at least 10, whereby a magnesium hydroxide floc is formed, permitting the floc to coagulate the solids present in the solution and to precipitate in the form of a sludge from which silver may be obtained by a separation process.

STEPHEN C. POOL.

REFERENCES CITED

The following references are of record in the file of this patent:

UNITED STATES PATENTS

| Number | Name | Date |
| --- | --- | --- |
| 2,131,045 | Hickman et al. | Sept. 27, 1938 |
| 2,131,072 | Reid | Sept. 27, 1938 |
| 2,254,976 | Powell | Sept. 2, 1941 |